US005577464A

United States Patent [19]
Wellington et al.

[11] Patent Number: 5,577,464
[45] Date of Patent: Nov. 26, 1996

[54] MODULAR ANIMAL HABITAT

[76] Inventors: Wayne L. Wellington; Nancy E. Wellington, both of 1516 Rock Island La., Las Vegas, Nev. 89110

[21] Appl. No.: 442,771

[22] Filed: May 17, 1995

[51] Int. Cl.$^6$ .................................................. A01K 1/00
[52] U.S. Cl. ........................... 119/475; 119/482; 119/452
[58] Field of Search ................................. 119/15, 19, 17, 119/161, 416, 452, 453, 454, 455, 459, 462, 467, 469, 473, 482, 484, 485, 419

[56] References Cited

U.S. PATENT DOCUMENTS

| | | | |
|---|---|---|---|
| D. 231,371 | 4/1974 | Willinger et al. | D30/42 |
| D. 232,036 | 7/1974 | Willinger et al. | D30/42 |
| 2,002,259 | 5/1935 | Cole | 119/19 |
| 3,653,357 | 4/1972 | Sheidlower et al. | |
| 3,742,908 | 7/1973 | Merino | 119/15 |
| 3,789,799 | 2/1974 | Orfei | 119/15 |
| 3,791,346 | 2/1974 | Willinger et al. | 119/17 |
| 3,994,262 | 11/1976 | Suchowski et al. | 119/29 |
| 3,998,187 | 12/1976 | Rodemeyer | 119/29 |
| 4,723,512 | 2/1988 | Margolis | 119/15 |
| 5,092,269 | 3/1992 | Phillips et al. | 119/15 |
| 5,186,122 | 2/1993 | Phillips et al. | 119/15 |

*Primary Examiner*—Robert P. Swiatek
*Assistant Examiner*—Yvonne R. Abbott
*Attorney, Agent, or Firm*—Richard C. Litman

[57] ABSTRACT

A modular animal habitat for crawling animals, such as ferrets and lizards. The habitat includes relatively large housings and relatively smaller tubes attachable to the housing. Housings and tubes have flat rear surfaces, and either or both housings and tubes have keyhole slots for accepting common fasteners, so that a modular habitat can be mounted to a vertical surface, such as a building wall. Some tubes have right angles built thereinto, so that the final assembled habitat can span perpendicular walls. The housings are designed so that the tubes are connected to housings at the rear, so that the tubes will be located against the wall. The housings have ventilation holes lined with an absorbent material, such as charcoal impregnated fabric. The housings have food, water, and waste trays which are pulled out therefrom. The housings also have fixed and slidably opening windows for visibility and access. Friction fit connectors are provided to mate and thereby extend plural tubes.

15 Claims, 2 Drawing Sheets

1
MODULAR ANIMAL HABITAT

BACKGROUND OF THE INVENTION

1. Field of the Invention

The present invention relates to a modular animal habitat comprising a plurality of large tanks and tubes interconnecting the same. The tubes are manually removable, so that the configuration of the assembled habitat can be changed without requiring dismantling of the entire system. The apparatus includes closures retaining animals within the habitat during reconfiguration thereof.

2. Description of the Prior Art

Artificial, modular habitats for animals are well known in the prior art. Examples of such habitats employing relatively large chambers and smaller interconnecting tubes are seen in U.S. Pat. Nos. 2,002,259, issued to Florent S. Cole on May 21, 1935, 3,653,357, issued to Stanley S. Sheidlower et al. on Apr. 4, 1972, 3,742,908, issued to Dennis H. Merino on Jul. 3, 1973, 3,789,799, issued to John B. Orfei on Feb. 5, 1974, 3,791,346, issued to Allan H. Willinger et al. on Feb. 12, 1974, and 4,723,512, issued to Jerry Margolis on Feb. 9, 1988.

These inventions generally describe extensive, modular habitats of the type wherein plural central chambers are connected by manually fitted tubes. However, these designs are not conducive to wall mounting.

None of the above inventions and patents, taken either singly or in combination, is seen to describe the instant invention as claimed.

SUMMARY OF THE INVENTION

The present invention provides a modular habitat for crawling animals, such as ferrets and lizards, which can be permanently mounted on a vertical surface, such as a building wall. An extensive, modular system may be erected, even with live animals housed within the habitat.

To these ends, the modular habitat includes housings providing large chambers, and interconnecting tubes. Both housings and tubes are not round, each having a flat rear surface. A flat rear surface enables steady support when the components are mounted on a wall. Mounting slots are provided in the rear surface to accommodate fasteners for fastening housings and tubes to a wall or like vertical environmental surface.

The principal chamber components of Sheidlower '357 would obviously be unsuitable for wall mounting due to the wide base. Centrally located horizontal flanges found in Orfei '799 and Margolis '512 would certainly interfere with upright, solid wall mounting. And in the case of Merino '908, the smaller, secondary housings are cylindrical. It should further be noted that the interconnecting tubes throughout the prior art neither include flat rear surfaces nor rear locations for wall mounting.

Modularity is provided by a friction fit between the tubes and the housings, and by connectors for connecting a plurality of tubes in series. Connectors include a flange for stopping excessive penetration of one tube along its associated connector. This assures that both tubes attached to a connector have adequate friction for gripping. Optionally, some tubes are formed to include a right angle cooperating with the corner formed at the junction of perpendicular walls of a building. Thus, the final habitat configuration can span adjoining, mutually perpendicular walls.

Other improvements to the general state of the art include a ventilation system employing a charcoal vent media for entrapping odors which might otherwise emanate from the habitat, and a novel sliding door defining a window when closed and providing access into the housing when open.

The housings and tubes are mostly opaque, and have selected transparent areas for viewing the animals.

Accordingly, it is a principal object of the invention to provide a modular animal habitat comprising relatively large chambers and interconnecting tubes which is suitable for mounting on a vertical surface.

It is another object of the invention to accommodate fasteners for fastening the novel habitat to walls.

It is a further object of the invention to span adjoining, mutually perpendicular walls.

Still another object of the invention is to provide a telescoping, frictional interfit between housings and tubes.

An additional object of the invention is to prevent excessive penetration between a connector and an associated tube.

It is again an object of the invention to provide a window which also provides access into the housing.

Yet another object of the invention is to provide a ventilation system which ventilates the habitat and controls odors.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
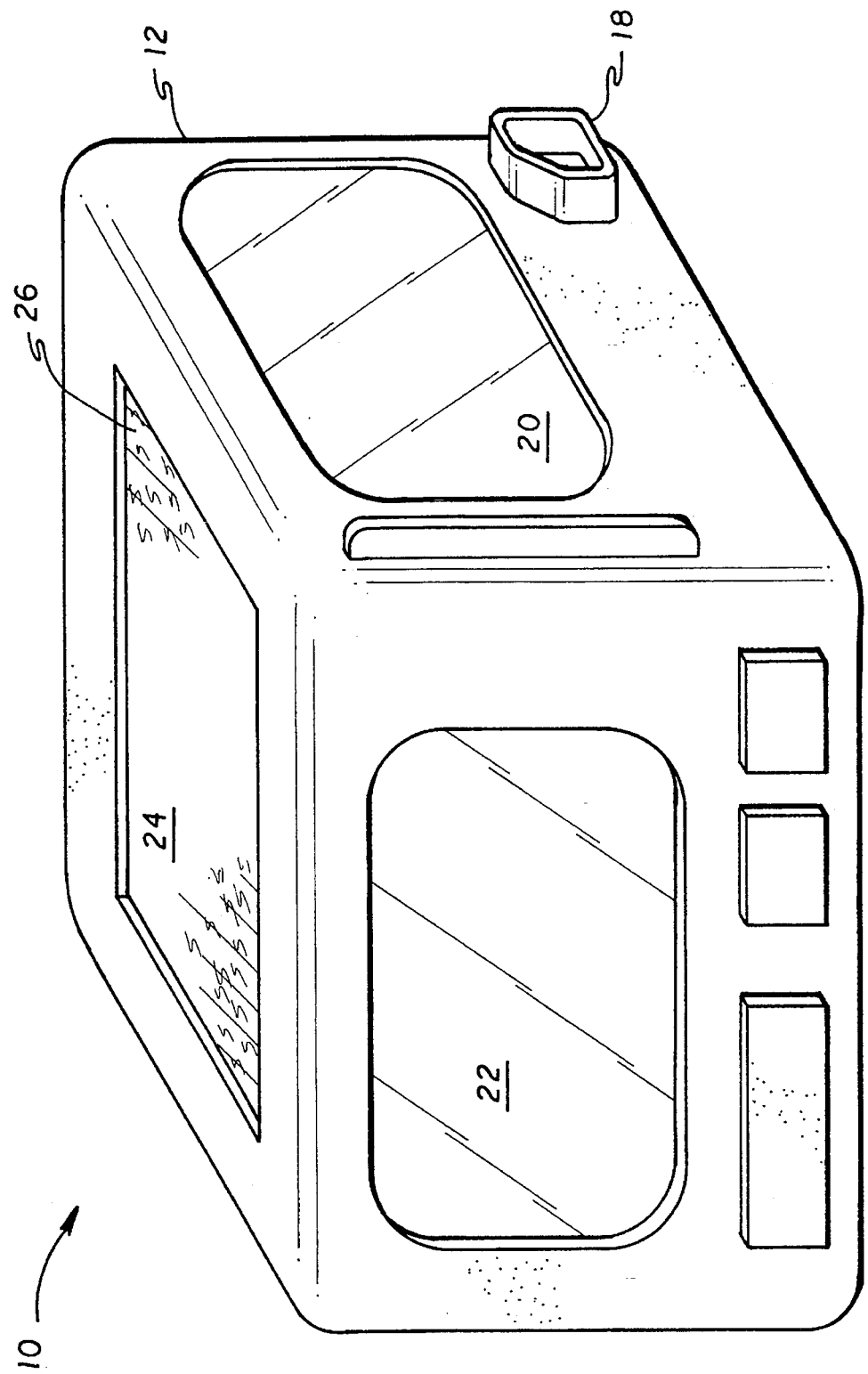
FIG. 1 is a perspective view of a housing.

FIG. 1 of the drawings illustrates a housing 10, a principal component of the novel habitat. The entire habitat preferably comprises a plurality of housings 10 interconnected by tubes, which will be described hereinafter. Each housing provides a chamber having space for normal animal activities, such as eating, sleeping, playing, and so forth. Any desired number of housings 10 may be interconnected. The animal will be both amused and afforded the ability to dedicate living space for individual activities by a habitat having many housings 10.

An individual housing 10 has a flat rear wall 12 to accommodate wall mounting. In flat rear wall 12 are formed keyhole slots for receiving a screw, tack, or other fastener (not shown) for fastening housing 10 to a wall or similar vertical environmental surface.

A short wall projecting from housing 10 located at the rear thereof enables the habitat to be extended by connection tubes. This structure will be referred to as a connector stub 18 hereinafter for brevity.

Individual trays are slidably mounted within housing 10. Much of housing 10 is opaque, and windows are provided to admit light and to enable observation of the animal. A fixed, permanent window 20 and a large, openable window 22 are shown in this Figure.

Ventilation orifice 24 is formed on the top wall of housing 10. Rather than being open, orifice 24 is covered with an absorbent filter 26, such as a charcoal impregnated fabric. Thus, objectionable odors are substantially intercepted, and prevented from permeating through to a room. A powered fan may be located as desired on housing 10, and may be disposed to force fresh air into the habitat.

Figure 2:
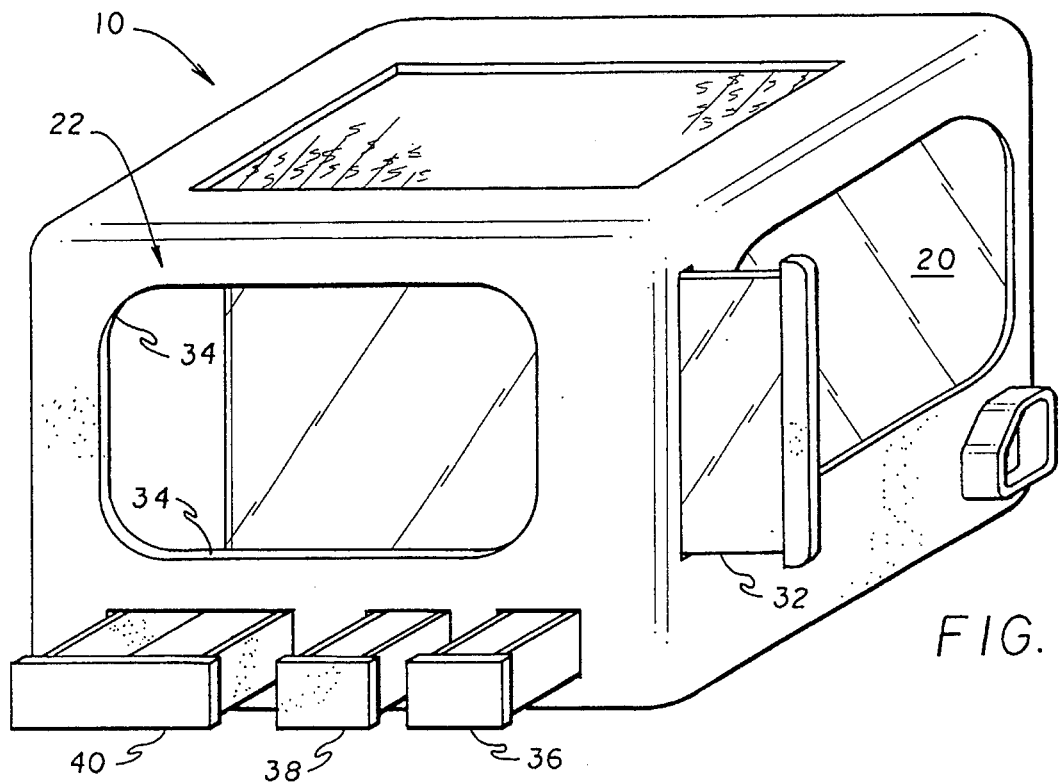
FIG. 2 is a perspective view of a housing, showing service trays and door open.

Turning now to FIG. 2, window 22 is shown open. This is accomplished by withdrawing a closure in the form of pane 32 from housing 10. Pane 32 is slidably mounted in a groove 34 formed in housing 10 and surrounding pane 32. Unlike window 20, which merely passes light, window 22 provides access into housing 10 when opened.

A food tray 36, a water tray 38, and a waste tray 40 are shown pulled out from housing 10. Cleaning and replenishment of water and food are accomplished by partially or fully opening the respective trays.

Figure 3:
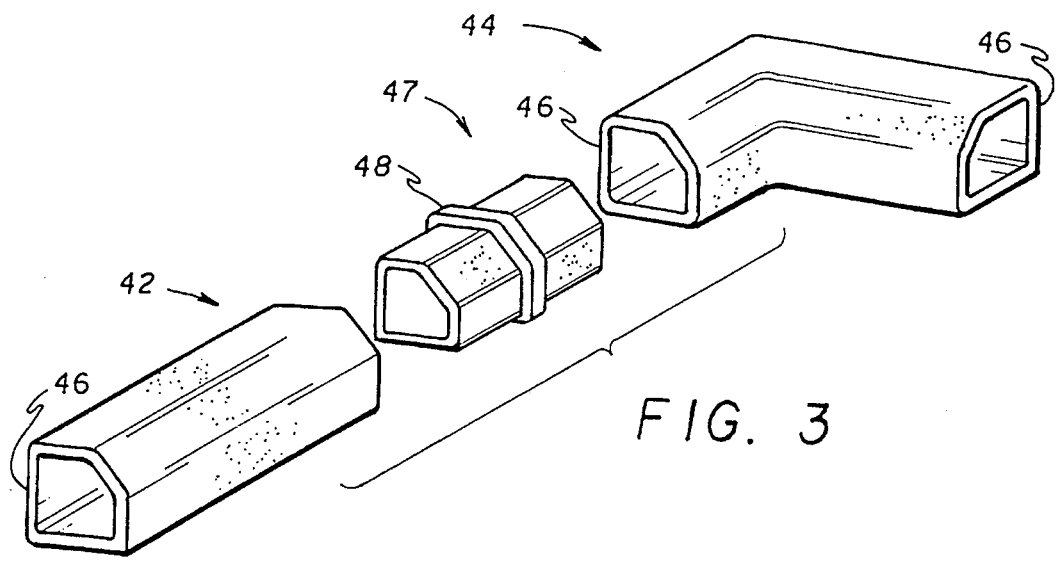
FIG. 3 is a perspective view of tubes and connectors employed to extend the modular habitat.

Connection tubes for interconnecting housings 10 are shown in FIG. 3. Two varieties of tubes are provided, including a straight tube 42 and a tube 44 forming a right angle. Tubes 42,44 preferably have flat rear walls 46 and optionally include on rear walls 46 keyhole slots for accommodating wall mounting. When connected to connector stubs 18 located at the rear of a housing 10, tubes 42,44 abut a wall surface, and can be stably mounted thereto.

The configuration of tube 44 enables this type of tube to be mounted in a corner of a room due to its ability to span mutually perpendicular vertical surfaces. Thus, an extensive habitat may span two or more walls of a room. This gives an animal a large amount of living space without requiring rooms or other space within a building to be dedicated solely to the habitat.

Tubes 42,44 are joined to adjacent tubes 42,44 where desired by connectors 47. A connector 47 fits telescopically to a tube 42 or 44 at each end. Any desired number of tubes 42 or 44 may be so joined. A connector 47 includes a radial flange 48 which stops or interferes with a tube 42 or 44 when the tube is interfit therewith. This assures that two joined tubes will each have sufficient frictional engagement with connector 47.

It is preferred that engagement of tubes 42,44 to connector stubs 18 and connectors 47 be by frictional interfit. To this end, inner and outer dimensions are selected to assure such a fit. Other forms of mechanical engagement may be provided where desired. Threaded fasteners, adhesives including hook and loop, clamps, and still other retaining apparatus may be substituted for friction fit.

For best weight distribution, it is preferred that both housings 10 and tubes 42,44 have keyhole mounting slots. However, it would be possible to omit some mounting slots from either type of component, relying instead upon the remaining slots to bear the weight of the habitat. Preferably, mounting slots are formed in the rear walls of their associated components, however mounting slots could also be disposed upon the top or the bottom walls.

Similarly, it is not necessary that both housings 10 and tubes 42,44 have flat rear walls. At least some of these components must mount securely to a wall, but others, such as the tubes, could lack this feature.

Another advantage of flat rear walls is that a non-circular configuration of tubes, connectors, and connector stubs prevents mutual rotation, which may assist in assembling habitats formed according to the instant invention.

It should further be noted that a full wall is not necessary to achieve the desired upright orientation of a housing 10 or tube 42 or 44. For the purposes of wall mounting, a flat rear surface signifies that the rearmost component of each selected component is flat. This is in contrast to constructions found in the prior art wherein a housing for a large chamber may include a rearwardly oriented flat surface, for the reason that such a surface is prevented from fully contacting a supporting wall due to a projection located behind the flat rear surface.

Aesthetics may affect whether connector 18 is outside or inside tubes 42,44. Either arrangement is possible, but a constant outer diameter is more easily accomplished when connectors 18 are located within tubes 42,44, radial flange 48 being of equivalent external dimensions as those of tubes 42,44.

Tubes 42,44 are preferably of varying areas of opacity and transparency. The animal may feel more secure as long as there are significant areas of opacity. Periodically located areas of transparency enable observation of the animal within tubes 42,44.

Still other alternative arrangements of the novel habitat are possible. For example, although connector stubs 18 are described as being located on lateral housing surfaces, they may also be located on top and bottom surfaces. Likewise, tubes 42,44 may be configured to include intersections, such as a T or an X, thus giving an animal a choice of which path within an assembled habitat to take.

In still another alternative construction a housing 10 may have double walls for providing improved temperature and sound insulation.

Still other alternative embodiments will occur to those skilled in the art. It is to be understood that the present invention is not limited to the embodiments described above, but encompasses any and all embodiments within the scope of the following claims.

We claim:

1. A modular animal habitat mountable to a vertical environmental surface, said animal habitat comprising:

at least one housing defining a chamber for containing an animal, and at least one connector stub formed in said at least one housing; and at least one tube having means for engaging said at least one connector stub, said at least one tube having a flat rear surface for contacting the vertical environmental surface.

2. The animal habitat according to claim 1 wherein said at least one housing has a flat rear surface for contacting the vertical environmental surface.

3. The animal habitat according to claim 2 wherein said flat rear surface of said at least one housing includes a mounting slot for receiving a fastener.

4. The animal habitat according to claim 1 wherein said flat rear surface of said at least one tube includes a mounting slot for receiving a fastener.

5. The animal habitat according to claim 1, wherein said at least one connector stub is located at the rear of said housing.

6. The animal habitat according to claim 1, said at least one tube forms a right angle.

7. The animal habitat according to claim 1, further comprising a connector which fits telescopically to said at least one tube, thereby enabling connection of a second tube thereto.

8. The animal habitat according to claim 7 wherein said connector includes a radial flange.

9. The animal habitat according to claim 1, wherein said at least one housing further includes a window therein, a groove surrounding said window, and a closure slidably mounted in said groove.

10. The animal habitat according to claim 1, wherein at least one of said at least one housing and said at least one tube includes a ventilation orifice having an absorbent filter.

11. A modular animal habitat mountable to a vertical environmental surface, said animal habitat comprising:

at least one housing defining a chamber for containing an animal, and at least one connector stub connected to said at least one housing, said at least one connector stub being located at the rear of said at least one housing;

at least one tube having means for engaging said at least one connector stub, at least one of said at least one housing and said at least one tube having a rear surface for contacting a vertical environmental surface, at least one of said at least one housing and said at least one tube including a mounting slot for receiving a fastener; and at least one connector fitting telescopically to said at least one tube, said at least one connector having a radial flange.

12. The animal habitat according to claim 11, wherein said at least one tube forms a right angle.

13. The animal habitat according to claim 11 wherein said at least one housing includes a window therein, a groove surrounding said window, and a closure slidably mounted in said groove.

14. The animal habitat according to claim 11, wherein at least one of said at least one housing and said at least one tube includes a ventilation orifice having an absorbent filter.

15. A modular animal habitat mountable to a vertical environmental surface, said animal habitat comprising:

at least one housing defining a chamber for containing an animal, said at least one housing including a window for providing access into said at least one housing, a groove surrounding said window, and a closure slidably mounted in said groove, and at least one lateral connector stub formed at the rear of said at least one housing;

at least one tube for connecting plural housings, said at least one tube having means for engaging said connector stub and forming a right angle, at least of said at least one housing and said at least one tube having a vertical rear surface for contacting the vertical environmental surface, at least one of said at least one housing and said at least one tube including a mounting slot therein for receiving a fastener;

at least one connector fitting telescopically to said at least one tube, thereby enabling connection of a second tube thereto, said at least one connector having a radial flange and a ventilation orifice formed in said at least one housing for passing air therethrough, said orifice having an absorbent filter.

* * * * *